United States Patent
Waibel et al.

(10) Patent No.: US 7,897,050 B2
(45) Date of Patent: Mar. 1, 2011

(54) DENSE GAS MEANS FOR EXTRACTION OF A SOLUTE FROM SOLIDS

(75) Inventors: Brian Jeffrey Waibel, Kennett Square, PA (US); Wayne C. Morton, Chesapeake City, MD (US); Sandra M. Cope, Elkton, MD (US)

(73) Assignee: Accudyne Systems, Inc., Newark, DE (US)

( * ) Notice: Subject to any disclaimer, the term of this patent is extended or adjusted under 35 U.S.C. 154(b) by 447 days.

(21) Appl. No.: 12/046,233

(22) Filed: Mar. 11, 2008

(65) Prior Publication Data

US 2008/0251454 A1 Oct. 16, 2008

Related U.S. Application Data

(60) Provisional application No. 60/923,487, filed on Apr. 12, 2007.

(51) Int. Cl.
*B01D 11/00* (2006.01)

(52) U.S. Cl. ........ 210/634; 196/14.52; 210/97; 210/103; 210/149; 210/173; 210/175; 210/206; 210/511; 210/739; 210/741; 210/742; 210/774

(58) Field of Classification Search .................. 210/143, 210/145, 149, 175, 177, 180, 205, 511, 634, 210/639, 739, 742, 774, 97, 103, 173, 206, 210/741; 554/8–23, 189; 208/187, 188; 426/489; 196/14.52

See application file for complete search history.

(56) References Cited

U.S. PATENT DOCUMENTS

| 1,024,230 | A |   | 4/1912  | Turner et al.             |
|-----------|---|---|---------|---------------------------|
| 1,447,296 | A | * | 3/1923  | Day .............. 202/107 |
| 1,862,945 | A |   | 6/1932  | Schlotterhose             |
| 2,778,717 | A | * | 1/1957  | Decker ............ 554/189|
| 2,973,312 | A |   | 2/1961  | Logan                     |
| 3,226,202 | A |   | 12/1965 | Nagelvoort                |
| 3,390,963 | A | * | 7/1968  | Wiegandt ........ 422/209  |
| 3,565,634 | A | * | 2/1971  | Osterman ........ 426/417  |
| 3,878,232 | A | * | 4/1975  | Hayes et al. ..... 554/14  |
| 3,941,679 | A |   | 3/1976  | Smith et al.              |
| 4,311,561 | A |   | 1/1982  | Hastings                  |
| 4,390,506 | A | * | 6/1983  | Schumacher ...... 422/273  |
| 4,434,028 | A |   | 2/1984  | Eppig et al.              |
| 4,443,321 | A |   | 4/1984  | Compton                   |
| 4,606,774 | A |   | 8/1986  | Morris                    |
| 4,749,552 | A |   | 6/1988  | Sakisako et al.           |
| 5,053,082 | A |   | 10/1991 | Flanigan et al.           |
| 5,080,721 | A |   | 1/1992  | Flanigan et al.           |
| 5,107,874 | A |   | 4/1992  | Flanigan et al.           |
| 5,154,831 | A |   | 10/1992 | Darian et al.             |
| 5,199,997 | A |   | 4/1993  | Stowe                     |
| 5,286,386 | A |   | 2/1994  | Darian et al.             |
| 5,316,029 | A |   | 5/1994  | Campbell et al.           |

(Continued)

FOREIGN PATENT DOCUMENTS

WO   WO 2005/042792 A1   5/2005

*Primary Examiner* — Joseph W Drodge

(74) *Attorney, Agent, or Firm* — Weaver Austin Villeneuve & Sampson LLP

(57) ABSTRACT

The present invention provides methods and systems for the extraction of solutes from solid matter using dense gases in a mechanical auger separation system.

50 Claims, 2 Drawing Sheets

U.S. PATENT DOCUMENTS

| | | |
|---|---|---|
| 5,344,493 A | 9/1994 | Jackson |
| 5,364,475 A | 11/1994 | Levien et al. |
| 5,454,878 A | 10/1995 | Bala et al. |
| 5,707,673 A * | 1/1998 | Prevost et al. ............ 426/417 |
| 5,904,855 A | 5/1999 | Manz et al. |
| 5,932,101 A | 8/1999 | Kanel et al. |
| 6,066,350 A | 5/2000 | Purtle et al. |
| 6,106,720 A | 8/2000 | Kanel et al. |
| 6,361,814 B2 | 3/2002 | Purtle et al. |
| 6,551,642 B2 * | 4/2003 | Trout ............................ 426/489 |
| 6,569,480 B2 | 5/2003 | Hall et al. |
| 6,610,343 B2 | 8/2003 | Purtle et al. |
| 6,934,472 B2 | 8/2005 | Chang et al. |
| 7,008,528 B2 | 3/2006 | Mitchell et al. |
| 2004/0014084 A1 | 1/2004 | Krukonis et al. |
| 2004/0035804 A1 | 2/2004 | Bischof |
| 2004/0065353 A1 | 4/2004 | Tunnicillffe et al. |
| 2005/0236015 A1 | 10/2005 | Goel et al. |

* cited by examiner

DENSE GAS MEANS FOR EXTRACTION OF A SOLUTE FROM SOLIDS

CROSS REFERENCE TO RELATED APPLICATIONS

This application claims the benefit of U.S. Provisional Application No. 60/923,487, filed on Apr. 12, 2007, the entire disclosure of which is hereby incorporated herein by reference for all purposes.

FIELD OF THE INVENTION

The present invention relates to the extraction of solutes from solid matter using dense gases in a mechanical auger separation system.

BACKGROUND OF THE INVENTION

Others have described methods and systems for extracting solutes from solid material. However, such processes generally are not energy efficient. For example, in previously described systems, the separation of solute from the solid is accomplished by adding water and/or a surfactant. See, e.g. U.S. Pat. Nos. 4,434,028; 5,199,997; 5,454,878; 5,154,831; and 5,286,386. The inclusion of water introduces an additional processing step, and is undesirable in certain contexts. Also, previously described systems do not allow for continuous processing, instead using batch processing or requiring batch centrifugation. See, e.g., U.S. Pat. Nos. 5,107,874; 5,080,721; 6,569,480; 5,344,493; and U.S. Patent Publication No. 2004/0014084. Batch processing has the shortcomings that it is not as efficient as continuous processing, oftentimes can not be scaled to desired production volumes, and is economically inferior when increased to desired production scales. Furthermore, many systems require processing through multiple augers or screw conveyers, which introduces additional inefficiencies. See, e.g., U.S. Pat. Nos. 1,024,230; 1,862,945; 3,226,202; 3,941,679; 4,311,561 and U.S. Patent Publication No. 2005/236015.

There remains a need for energy and economically efficient systems for extracting solutes from solid materials that does not suffer from the above shortcomings. The present invention addresses this and other needs.

BRIEF SUMMARY OF THE INVENTION

In a first aspect, the present invention provides methods of extracting and separating a solute from an insoluble composition using an inclined auger in a pressurized chamber, the method comprising:

a) passing the insoluble composition comprising solute into a pressurized inclined housing containing an auger;

b) combining the insoluble composition with a solvent gas in either the supercritical or liquid phase to dissolve the solute, thereby extracting the solute from the insoluble composition;

c) maintaining pressure in the housing sufficient to create a biphasic dense gas comprising a vapor phase and a liquid phase; and d) rotating the auger to promote the separation of the insoluble composition from the solute;

whereby the solute and the liquid phase of the dense gas flow to the bottom of the auger for removal and the insoluble composition and vapor phase of the dense gas move to the top of the auger for removal, thereby separating the solute from the insoluble composition. To maintain the biphasic dense gas, the pressure and/or temperature in the housing containing the auger are below the critical point of the gas. Oftentimes, a saturation pressure for the gas is maintained at ambient temperature conditions.

The inclined auger finds use in separating the liquefied gas from the solid substrate. The inclined auger also finds use in simultaneously (i.e., concurrently) extracting the solute from the insoluble composition and in separating the liquefied gas from the solid substrate.

The insoluble composition can optionally be pre-mixed with a solvent gas. In some embodiments, the insoluble composition is first raised to super-ambient pressures and then introduced into the extraction chamber or introduced directly into the pressurized inclined auger housing. The solid compositions can also be pressurized before mixing with the solvent gas. For example, the solid can be passed first into a pressurized or pressurizing chamber, raised to a desired superambient pressure, and then subsequently contacted with the solvent gas.

Accordingly, in a related aspect, the methods provide for extracting and separating a solute from an insoluble composition using an inclined auger in a pressurized chamber, the method comprising:

a) exposing an insoluble composition comprising solute to super-ambient pressure conditions;

b) passing the pressurized insoluble composition into a pressurized inclined housing containing an auger;

c) combining the pressurized insoluble composition with a solvent gas in either the supercritical or liquid phase to dissolve the solute, thereby extracting the solute from the insoluble composition;

d) maintaining pressure and/or temperature in the housing sufficient to create a biphasic dense gas comprising a vapor phase and a liquid phase; and e) rotating the auger to promote the separation of the insoluble composition from the solute;

whereby the solute and the liquid phase of the dense gas flow to the bottom of the auger for removal and the insoluble composition and vapor phase of the dense gas move to the top of the auger for removal, thereby separating the solute from the insoluble composition.

In some embodiments, the methods further comprise step e) washing the insoluble composition with solvent liquid phase gas.

Suitable solvent gases include those known in the art. For example, the solvent gas can be an inert gas, an alkane gas, an alkene gas, an alkyne gas, and a noble gas. In some embodiments, the solvent gas contains one or more of nitrogen, carbon, hydrogen, oxygen, silicon, sulfur or halogen. Nitrogen containing gases include ammonia, nitric oxide, nitrogen dioxide, and nitrous oxide. Silicon containing gases include silane, chlorotrifluorosilane, and tetrafluoro silane. Sulfur containing gases include sulfur dioxide and sulfur hexafluoride. Halogen containing gases include monofluoro methane, trifluoro methane, tetrafluoro methane, monochlorodifluoro methane, monochlorotrifluoro methane, dichlorodifluoro methane, dichloromonofluoro methane, trichlorofluoro methane, monobromotrifluoro methane, monofluoro ethane, hexafluoro ethane, chloropentafluoro ethane, perfluoro butane and 1,1 difluoro ethylene.

In some embodiments, the solvent gas is selected from butane, isobutane, propane, carbon dioxide, dimethyl ether, methane, ethane, nitrous oxide, propylene, isobutene, ethylene, sulfur hexafluoride, ammonia, gaseous hydrocarbons, gaseous halogenated hydrocarbons, fluorocarbons, and mixtures thereof. In some embodiments, the solvent gas is dimethyl ether. In some embodiments, the solvent gas is n-butane.

In some embodiments, the method is continuous.

The mixture can passed through one auger, or through multiple (i.e., two or more) augers. Multiple augers can be operated in parallel, in sequence (serially), or both.

In some embodiments, the mixture is aqueous (i.e., is 50% or more of water). In some embodiments, the mixture is non-aqueous. In some embodiments, no additional water, surfactants or other additives are added to the mixture.

In some embodiments, the solvent gas is introduced into the auger at saturation conditions such that control of the pressure results in a temperature near ambient conditions. In some embodiments, the solvent gas is at saturation conditions in the housing containing the auger.

In some embodiments, the auger is used at or near (e.g., 5° C. or less) ambient temperature. In some embodiments, the temperature of the auger is maintained at a superambient temperature. In some embodiments, the temperature of the auger is maintained at subambient temperature. At ambient temperatures, superambient pressures can be maintained for saturation of the gas (e.g., to achieve the biphasic dense gas).

In some embodiments, the insoluble composition is plant matter. For example, the insoluble composition can be flaked seed from an oilseed plant. In some embodiments, the oilseed plant is, for example, soybean, rapeseed, canola, camolina, corn, distillers grains, sunflower, palm, jatropha, safflower, cottonseed, flax, peanut, sesame, olive and coconut. The insoluble composition can be from a plant nut. In some embodiments, the plant nut is from, for example, almond, cashew, hazelnut, macadamia, pecan, pistachio and walnut. The insoluble composition can be a wood material. In some embodiments, the wood material is from a tree selected from cedar, pine or juniper.

In some embodiments, the insoluble composition is animal matter. For example, the insoluble composition can be animal by-products from a meat rendering plant or a by-product of wastewater from a protein processing facility. Usually, the animal matter is edible by humans or domesticated animals (e.g., canines or felines), or is waste from the processing of edible animal matter. In some embodiments, the animal matter is from, for example, avian (e.g., chicken, turkey, ostrich, emu), porcine, bovine, ovine (e.g. lamb, sheep or goat), deer (i.e., venison), buffalo or fish. In some embodiments, the animal matter is beef rendering, chicken rendering, pork rendering, or fish rendering. In some embodiments, the animal matter is poultry, pork, beef, veal, lamb or mutton.

In some embodiments, the insoluble composition is geological matter. The solute can be naturally occurring or man-made (e.g., contaminants or waste products). For example, the solute can be organic chemical constituents, including hydrocarbons, crude petroleum products, refined petroleum products, synthetic compounds, and the like.

In some embodiments, the insoluble composition is swarf or metal cuttings. In some embodiments, the insoluble composition is industrial or man-made waste.

In some embodiments, the insoluble composition is polymer waste material, for example, polytetrafluoroethylene (PTFE or Teflon®) or polyetheretherketone (PEEK) resulting from molding, forming, or machining processes.

In another aspect, the invention provides systems of extracting and separating a solute from an insoluble composition using an inclined auger in a pressurized chamber. In some embodiments, the systems comprise:
 a) a solid feed inlet configured to receive a mixture of a solid particles and a solute;
 b) a solvent inlet configured to receive a solvent;
 c) a pressurized inclined tube having an inner diameter in fluid communication with an outlet of the solid feed inlet; the pressurized inclined tube having a first outlet near the first end and a second outlet at or near the second end of the pressurized inclined tube, and a first inlet located between the first and second outlets, the first inlet being configured for fluid communication with the solid feed inlet;
 d) a screw dimensioned to fit within the pressurized inclined tube, such that the screw and the pressurized inclined tube together form an auger separator; the screw having an outer diameter that is smaller than the inner diameter of the pressurized inclined tube by a clearance gap; and
 e) control means for operating the auger separator configured for: (a) maintaining pressure and/or temperature conditions sufficient to create a biphasic dense gas comprising a vapor phase and a liquid phase in the auger separator; (b) delivering the solid particles and the solvent in gaseous form towards the second outlet of the pressurized inclined tube; and (b) delivering the solvent and the solute in a liquid form towards the first outlet through the clearance gap. In some embodiments, the systems only have a control means for maintaining pressure sufficient to create a biphasic dense gas, e.g. for systems that operate at ambient temperatures.

In some embodiments, the system further comprises a mixer configured to continuously mix the solid particles and the solute into the solvent to form a slurry, wherein the mixer is in fluid communication with the solid feed outlet and the first inlet of the pressurized inclined tube.

The angle of inclination of the pressurized inclined tube can be up to about 90 degrees, for example from about 15 degrees to about 90 degrees, for example, about 20 to 60 degrees, for example, about 15, 20, 25, 30, 35, 40, 45, 50, 55, 60, 65, 70, 75, 80, 85, 90 degrees.

In some embodiments, the control means is configured to control at least one parameter selected from the group consisting of: the pressure of the inclined pressurized tube, the temperature of the pressurized inclined tube, the speed of the rotation of the screw, the pitch of the screw, the feed rate of the solid feed; the feed rate of the slurry, the feed rate of the solvent, and combinations thereof.

In some embodiments, the control means is configured to (a) deliver the drained solids uphill to the second outlet, (b) maintain a liquid solvent level upstream of the second outlet and (c) cause the solvent and the solute to flow down the auger separator due to gravity-induced flow toward the first outlet.

In some embodiments, the screw speed, as determined by the auger drive motor speed, is set at a level sufficiently low such that liquid solvent drains from solid at a rate faster than the solid is being raised, so as to avoid filling the auger entirely with fluid.

In some embodiments, the system further comprises a second inlet at a higher elevation than that for the first inlet for delivering a solvent, configured to be in fluid communication with the pressurized inclined tube. The second inlet can be configured to deliver a solvent between the solid feed inlet and the second, higher elevation discharge outlet. The second inlet can be configured to deliver the solvent in a liquid state.

In some embodiments, a portion of the pressurized inclined tube is permeable. For example, the pressurized inclined tube can be permeable at a section below V3, defined as the permeable drain zone.

In the systems and the methods, the solvent can be partially saturated with the solute. In some embodiments, the solvent is essentially free of the solute.

Further embodiments for the systems are as described for the methods. For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DEFINITIONS

The term "gas" refers to a material that exists in the vapor phase at standard temperature and pressure. Standard temperature and pressure is defined to be 25° C. and 1 atmosphere, respectively.

The term "biphasic dense gas" refers to a gas maintained at a pressure and temperature condition such that gas can simultaneously exist in vapor and liquid phase. For the purposes of the present invention, the pressure and temperature of the dense gas is below the critical temperature and pressure of the gas. Because the gas exists in a biphasic state, either the pressure is maintained as the independent variable while the temperature is a dependent quantity or the temperature is maintained as the dependent variable while the pressure is a dependent quantity.

The term "solvent" refers to substance which is capable of absorbing another liquid, gas, or solid to form a homogeneous mixture. In the present invention, the solvents used are liquid phase gases, supercritical gases or biphasic dense gases.

The term "insoluble composition" refers to a composition that has about 10% (w/v or v/v) or less solubility in water. An insoluble composition can be liquid or solid. In some embodiments, the insoluble composition has about 9%, 8%, 7%, 6%, 5%, 4%, 3%, 2% or 1% or less solubility in water.

The term "inclined" and "inclined auger" interchangeably refer to non-horizontal. "Inclined" refers to a sufficient angle from horizontal to allow liquid phase (e.g., solvent and/or solute) to drain downward. In some embodiments, the range of incline is from about 10° from horizontal to about 90° from horizontal. In some embodiments, an inclined auger is positioned vertically.

The term "geological matter" or "terrestrial matter" interchangeably refer to solid, inanimate matter extracted from the earth. For the purposes of the present invention, the geological matter will contain extractable solute from natural and/or unnatural sources. Solute in geological matter from natural sources can include, for example, hydrocarbon substances, including tar, natural gas, crude oil, etc. Solute in geological matter from unnatural sources (i.e., waste) can include, for example, hydrocarbon substances, including tar, natural gas, crude oil, refined oil, industrial waste, synthesized organic compounds, etc. Exemplified geological matter suitable for extraction by the present methods and systems include, without limitation, oil cuttings, tar sands, oil shale, and the like.

The term "plant matter" refers to solid matter, viable or non-viable, from species of the plant kingdom. Exemplified plant matter can be from any part of a plant, including, without limitation, seeds, stems, leaves, roots, flowers, fruits, vegetables, pollen, and the like.

The term "animal matter" refers to solid matter, viable or non-viable, from species of the animal kingdom. The animal matter will oftentimes be composed of proteins, bone and/or fats.

Animal matter "rendering" refers to any processing of animal byproducts into more useful materials, for example, the rendering of whole animal fatty tissue into purified fats like lard or tallow. Rendering material can include the fatty tissue, bones, and offal, as well as entire carcasses of animals. Animal matter sources include beef, pork, sheep, and poultry. The rendering process simultaneously dries the material and separates the fat from the bone and protein. In some cases, a rendering process yields a fat commodity (e.g., yellow grease, choice white grease, bleachable fancy tallow, etc.) and a protein meal (e.g., meat & bone meal, poultry byproduct meal, etc.).

The term "superambient pressure" refers to a pressure above the pressure at ambient conditions. The pressure at ambient conditions exists without applied pressure or vacuum.

The term "subambient pressure" refers to a pressure below the pressure at ambient conditions.

The term "superambient temperature" refers to a temperature above the temperature at ambient conditions. The temperature at ambient conditions exists without applying heating or cooling.

The term "subambient temperature" refers to a temperature below the temperature at ambient conditions.

The term "swarf" refers to the debris or waste resulting from metalworking operations. It can consist of shavings and chippings of metal. The present invention can be employed to remove contamination of swarf by, for example, cutting fluid or tramp oil.

DETAILED DESCRIPTION OF THE INVENTION

1. Introduction

The embodiments of the present invention are related to the field of dense gas extraction. The embodiments of the present invention provide a method to continuously extract a non-chemically bound solute from a particulate solid with a gas in the liquid or supercritical state and to subsequently separate the solute/solvent solution from the solid particulate substrate in an energetically favorable manner. Furthermore, "neat" liquefied gas solvent can be introduced into the separation means as a countercurrent wash to reduce the solute content in the discharged solid. The separation means can utilize an inclined auger (e.g., a mechanical screw) encased within a tubular structure. A liquid level is maintained in the auger so that at the lower elevations the solid is immersed in liquid solvent. The auger is configured to convey the solids from the liquid phases into the gaseous head space. For solids that can percolate (i.e., the liquid can freely drain from the solid), this process provides the means to separate the liquefied gas solvent from the solid matter.

Continuous extraction of solid materials via gas extraction is an area with significant economic potential. Gas extraction herein implies the use of solvent that exists in the gas state at atmospheric pressure and nominal ambient temperature. As used herein, gas extraction implies the use of a gas at pressures and temperatures such that the gas is in the liquid or supercritical state. For purposes of separation in accordance with the embodiments of the present invention, the gas is at the saturated condition, such that the liquid and vapor state of the solvent can coexist. By maintaining the solvent gas at saturation conditions, only one solvent gas is needed to maintain the vapor layer.

2. Methods of Extraction

Figure 2:
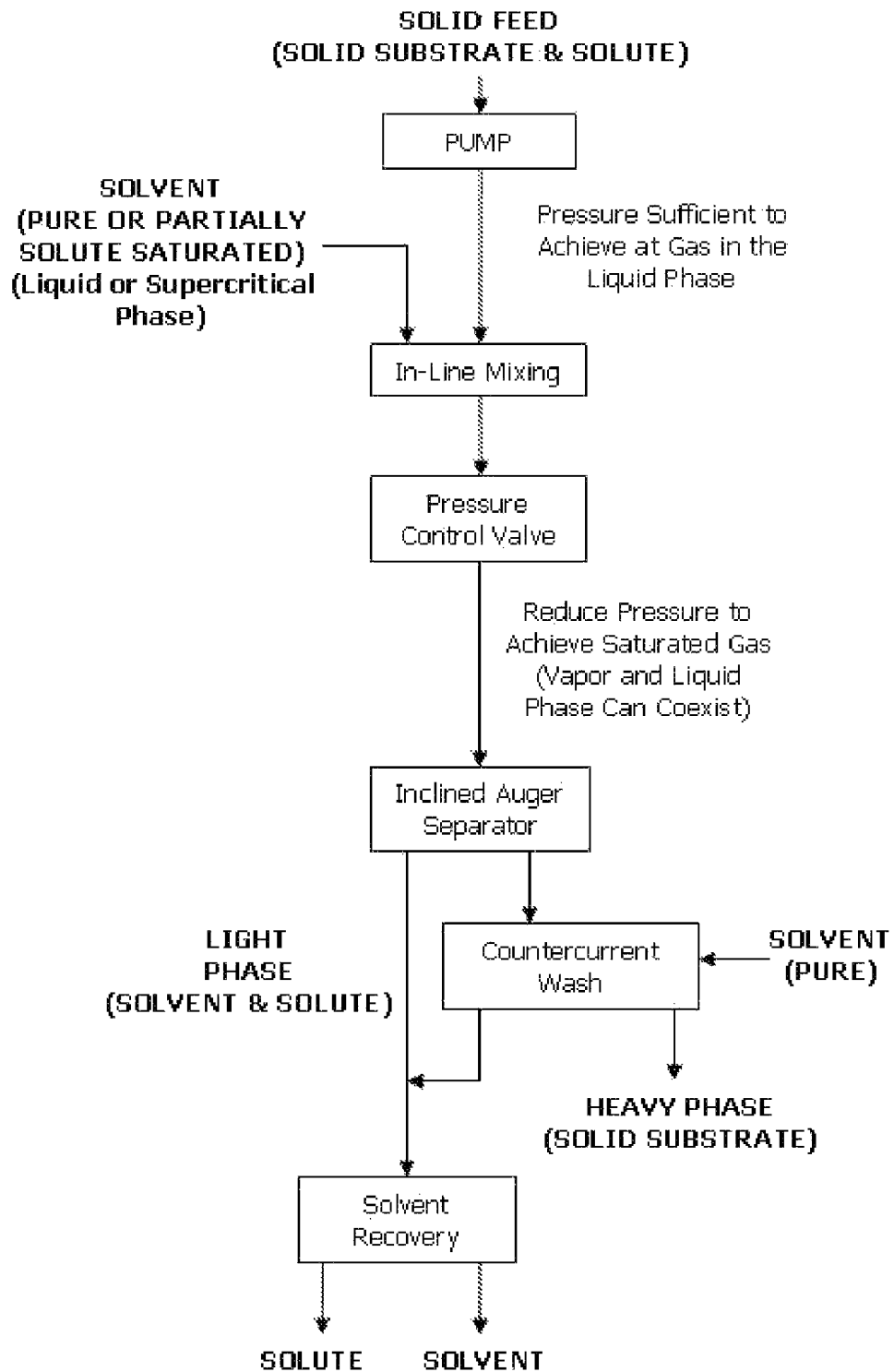
FIG. 2 illustrates a process sequence for continuous extraction.

As set forth above, the embodiments of the present invention provide a method for extracting a solid material with a gas solvent in the liquid or the supercritical state and is shown in the process sequence in FIG. 2. The process is described below in further detail. The process of FIG. 2 can be carried out by the systems shown in the figures. In some embodiments, the extraction process is performed continuously. The process can involve the receipt of a solid feed nominally at atmospheric pressure and optionally at any pressure below that required to achieve a liquid state of the gaseous solvent at the nominal operating temperature. In some embodiments, the solid feed can be delivered at a pressure equal to or greater than that required to have the gas exist in the liquid phase. In this case, the pump can be replaced by either a control valve or a flow restriction device. The solid feed can be pressurized before exposure to the solvent gas.

a. Combining in a Mixture an Insoluble Composition Comprising a Solute with a Solvent Gas in the Supercritical or Liquid Phase i. Insoluble or Solid Compositions Comprising a Solute The insoluble or solid material can be a rigid or friable particulate, or can be naturally derived. Solid matter containing solute for extraction by the embodiments of the present invention can include a wide range of potential feedstocks, including but not limited to, plant matter, animal matter, metal cuttings, polymer waste, and geological matter (e.g., oil contaminated drill cuttings).

In some embodiments, the solid compositions subject to processing using the methods and systems of the invention are biological (e.g., plant matter or animal matter). Plant matter includes vegetable matter, nuts and oilseed matter, including but not limited to, algae, nuts (e.g., peanuts, almonds, cashews, hazelnuts, walnuts, pecans, macadamia, pistachio, etc.), cocoa beans, oilseed (e.g., soybean, rapeseed, canola, camolina, cottonseed, corn germ, sunflower, jatropha, etc.).

Animal matter includes by-products (e.g., proteins and fats) of meat rendering processes. Animal matter to be processed can be edible to humans or domesticated animals. In some embodiments, the animal matter is from, for example, avian (e.g., chicken, turkey, ostrich, emu, partridge, pigeon, quail), porcine, bovine, ovine (e.g. lamb, sheep or goat), deer (i.e., venison), buffalo or fish. In some embodiments, the animal matter is selected from beef or veal rendering, chicken rendering, pork rendering, mutton or lamb rendering, and fish rendering.

The matter to be processed also can be inanimate (i.e., non-biological) or synthetic. For example, the solid compositions can be metal, synthetic polymers, or geological matter (e.g., rocks, soil). Metal cuttings (i.e., swarf) include cuttings from machining operations and spent catalyst. Polymer waste includes byproducts of polymer forming, molding, and machining operations. Geological matter includes oil contaminated drill cuttings, for example, from oil exploration, including tar sands and oil shale.

ii. Solvent Gas in Supercritical or Liquid Phase

Suitable solvent gases for use in the present methods and systems include any gas that can be employed as a supercritical gaseous agent. Typically, the solvent gas for use in the present methods and systems will be a liquid at or near ambient temperature conditions (e.g., about 20-30° C.) under superambient pressure of 10 bars or less, preferably under superambient pressure of 9, 8, 7, 6, 5, 4, 3, 2 bars or 1 bar, or less. In some embodiments, the solvent gases employed in the present systems and methods have a molecular weight of less than about 200 g/mol. Solvent gases that find use include, without limitation, those listed in Table 1.

TABLE 1

| | SYMBOL | CRITICAL TEMP (° C.) | CRITICAL PRESSURE (atm.) |
|---|---|---|---|
| (A) ELEMENTALS | | | |
| (a) Noble gases: | | | |
| (1) Helium | He | −267.9 | 2.26 |
| (2) Neon | Ne | −228.7 | 27.9 |
| (3) Argon | Ar | −122.3 | 48.0 |
| (4) Krypton | Kr | −63.8 | 54.3 |
| (5) Xenon | Xe | 16.6 | 58.0 |
| (b) Others: | | | |
| (6) Nitrogen | $N_2$ | −147.0 | 33.5 |
| (7) Hydrogen | $H_2$ | −239.9 | 12.8 |
| (8) Oxygen | $O_2$ | −118.4 | 50.1 |
| (9) Ozone | $O_3$ | 12.0 | 55.0 |
| (10) Fluorine | $F_2$ | −129 | 55 |
| (B) INORGANIC COMPOUNDS | | | |
| (1) Ammonia | $NH_3$ | 132.5 | 112.5 |
| (2) Boron Trifluoride | $BF_3$ | −12.26 | 49.2 |
| (3) Carbon Dioxide | $CO_2$ | 31.0 | 72.9 |
| (4) Carbon Monoxide | CO | −140 | 34.5 |
| (5) Hydrogen Chloride | HCl | 51.4 | 82.1 |
| (6) Hydrogen Sulfide | $H_2S$ | 100.4 | 88.9 |
| (7) Nitric Oxide | NO | −93 | 64 |
| (8) Nitrogen Dioxide | $NO_2$ | 157.8 | 100 |
| (9) Nitrous Oxide | $N_2O$ | 36.5 | 71.7 |
| (10) Silane | $SiH_4$ | −3.46 | 47.8 |
| (11) Silane Chlorotrifluoro | $SiClF_3$ | 34.5 | 34.2 |
| (12) Silicon Tetra Fluoride | $SiF_4$ | −14 | 36.7 |
| (13) Sulfur Dioxide | $SO_2$ | 157.8 | 77.7 |
| (14) Sulfur Hexafluoride | $SF_6$ | 45.6 | 37.1 |
| (C) ORGANIC COMPOUNDS | | | |
| (a) Alkanes: | | | |
| (1) Methane | $CH_4$ | −82.1 | 45.8 |
| (2) Ethane | $C_2H_6$ | 32.2 | 48.2 |
| (3) Propane | $C_3H_8$ | 96.8 | 42 |
| (4) n-butane | $C_4H_{10}$ | 152 | 37.5 |
| (5) iso-butane | $C_4H_{10}$ | 134.7 | 35.9 |
| (b) Alkenes: | | | |
| (6) Ethene (Ethylene) | $C_2H_4$ | 9.9 | 50.5 |
| (7) Propene (Propylene) | $C_3H_6$ | 91.9 | 45.5 |
| (8) n-butene | $C_4H_8$ | 146 | 39.7 |
| (c) Alkynes: | | | |
| (9) Ethyne (acetylene) | $C_2H_2$ | 35.5 | 61.6 |
| (d) Alkylhalides: | | | |
| (10) Monofluoro Methane | $CH_3F$ | 44.6 | 58 |
| (11) Trifluoro Methane (Fluoroform) | $CHF_3$ | 25.9 | 46.9 |
| (12) Tetrafluoro Methane | $CF_4$ | −45.7 | 41.4 |
| (13) Monochlorodifluoro Methane | $CHClF_2$ | 96 | 48.5 |
| (14) Monochlorotrifluoro Methane | $CClF_3$ | 28.8 | 38.2 |
| (15) Dichlorodifluoro Methane | $CCl_2F_2$ | 111.5 | 39.6 |
| (16) Dichloromonofluoro Methane | $CHCl_2F$ | | |
| (17) Trichlorofluoro Methane | $CCl_3F$ | | |
| (18) Monobromotrifluoro Methane | $CBrF_3$ | 67 | 50.3 |
| (19) Monofluoro Ethane | $C_2H_5F$ | 102.2 | 49.6 |
| (20) Hexafluoro Ethane | $C_2F_6$ | 24.3 | — |
| (21) Chloropentafluoro Ethane | $C_2ClF_5$ | 80 | — |
| (22) Perfluoro Butane | $C_4F_{10}$ | 113.2 | 23 |
| (23) 1,1-Difluoro Ethylene | $C_2H_2F_2$ | 30.1 | — |

Suitable solvent gases of use in the present systems and methods include, without limitation, gaseous oxides including carbon dioxide and nitrous oxide; alkanes including methane, ethane, propane, n-butane, and isobutane; alkenes including ethylene, propylene, n-butene and isobutene; alkynes including ethene; ethers including dimethyl ether and diethyl ether; esters including ethyl acetate; halogenated compounds including sulfur hexafluoride, chlorofluorocarbons such as trichlorofluoromethane, dichlorofluoromethane, difluorochloromethane, and fluorocarbons including trifluoromethane; and elemental liquefied gases including xenon and nitrogen and other liquefied compressed gases known to the art. In some embodiments, the solvent gas is selected from the group consisting of butane, isobutane, isobutene, propane, carbon dioxide, dimethyl ether, methane, ethane, nitrous oxide, propylene, ethylene, sulfur hexafluoride, ammonia, gaseous hydrocarbons, gaseous halogenated hydrocarbons, fluorocarbons, and mixtures thereof. Additional suitable gases are disclosed in U.S. Pat. Nos. 4,345,976; and 4,749,522, hereby incorporated herein by reference in their entirety for all purposes.

The solid can be combined with an appropriate solvent gas. For example, where the solute is an oil or oil-like material, for example, nuts, oilseeds, rendered bone meal or animal matter, metal cuttings, polymer waste, drill cuttings, tar sand, or oil shale, then the preferred solvent is a nonpolar and/or hydrophobic solvent, for example, methane, ethane, propane, butane, etc. In the case of algae and vegetable matter, the preferred solvent is a polar solvent that dissolves both organic compounds and water, for example, an oxide or an ether, for example, carbon dioxide, dimethyl ether, nitrous oxide, ammonia, etc. The solvent can be in a neat or pure state (i.e., it is essentially solute free) or can be partially saturated with solute. In one embodiment, the solvent is partially saturated with solute allowing for efficient use of the solute prior to executing the process steps to separate the solute from the solvent.

iii. Combining Solid with Solvent Gas

As an initial matter, the insoluble or solid composition can be first subjected to superambient pressures before exposure to or mixing with the supercritical or liquid phase gas. In some embodiments, the insoluble or solid composition is first mixed with the supercritical or liquid phase gas and then subject to superambient pressures.

One of several schemes can be used to deliver the solid material into the extraction process. Any pump that is suitable for increasing the pressure of the solid feed from atmospheric pressure to a super-ambient pressure sufficient for the liquefied gas can be used and can include piston pumps, peristaltic pumps, progressive cavity pumps, concrete pumps, and/or diaphragm pumps. The disclosed pumps are meant to illustrate that such pumps can be used to increase the pressure of the solid feed, and are not meant to limit the embodiments to any one specific pump type.

In the case of solute constituents that are not chemically bound to the solid substrate and solute constituents are miscible or partially miscible with the solvent, the kinetics associated with the solvent dissolving the solute are very rapid. In order for this rapid action to occur, however, the solvent may need to be well-mixed (i.e., mixed to homogeneity) with the solid feed. While this could be done in a batch mixing tank, it is preferred that an in-line mixing device be used. Suitable devices include a passive device, including a static mixer, or an active device, including an in-line mixer or an in-line blender. The precise selection of the mixing device is dependent on the fluid mechanical behavior of the particulate solid suspended in solvent.

Properties of the particulate solids suspended in solvent that can impact the operation of the extraction process include density, viscosity and solid particle size distribution. The density can by varied as desired, depending on the solid substrate of interest. The density should be not so great as to impede movement of the solids by the auger, and not so little such that insufficient agitation occurs between the solids in the slurry. The viscosity is adjusted to be sufficiently low to enable pumping of the solid (e.g., in the slurry) and enable fluidization in the auger. In some embodiments, viscosity is in the range of about 1 to about 10000 centipoise (cp), for example, about 1, 10, 50, 100, 500, 1000, 5000, or 10000 cp. Particle size can range from about 10 microns to about 1000 microns in average diameter, for example, about 10, 50, 75, 100, 250, 500, 1000 microns in average diameter. In some embodiments, the particle size is about 250-500 microns in average diameter.

b. Passing the Mixture into a Pressurized Housing Containing an Auger

The pressurized inclined auger can be used in several different modes, as desired. For example, the inclined auger finds use for separating the liquefied gas from the solid substrate. The inclined auger also finds use in simultaneously (i.e., concurrently) extracting the solute from the insoluble composition and in separating the liquefied gas from the solid substrate.

Extraction can, but need not take place within the auger tube. In some embodiments, extraction is primarily carried out in an extraction chamber to where the mixture of solids and solvent are first delivered before being delivered to the pressurized auger tube. Extraction chambers can employ any method for agitation known in the art to effect extraction of the solute into the solvent, including shaking, stirring, and pressurized solvent flow (e.g., countercurrent column processes). For example, vegetable matter or animal matter can be effectively extracted in a stirred chamber before introduction into the auger. As demonstrated in FIGS. 4-12, oilseed matter can be effectively extracted in a countercurrent column process, wherein a moving packed bed of oilseed flake descends through a rising column of liquefied gas.

Those of skill will also readily recognize that one or more solutes can be extracted from the solid compositions. The methods and systems of the invention allow for the simultaneous extraction of multiple solutes, for example, water and oil; water and lipid; or water, lipid and carotenoids.

Subsequent to the mixing operation, the particulate solid can be separated from the solvent solution. The most energetically favorable method to remove the solvent solution from the solid is by mechanical separation. As used herein, mechanical separation refers to a method that does not result in a change in phase of the solid and also does not require the introduction of an additional material stream (e.g., water and/or surfactant) to remove the solid from the solvent gas.

There are at least two methods for achieving the separation of the solid from the solvent: a cyclonic separator such as that typified in Laval, U.S. Pat. No. 3,947,364 or an inclined auger mechanism. While a cyclonic separator can be modified to enable the present novel extraction, the cyclonic separator has the limitation that it does not readily provide a means to secondarily wash the discharging material with solvent and that the underflow, or nominally solid discharge, from a cyclonic separator retains a high solvent liquid content. Removal of the solvent liquid also requires conversion of the solvent from the liquid phase to the gaseous phase, an energetically unfavorable process.

The inclined auger is a mechanical screw encased within a tubular structure. The dimensional tolerance of the inside diameter of the tube and the outside diameter of the screw are maintained so that the clearance between the two mechanical elements is small relative to the majority of solid particle dimensions. The clearance between the inside diameter of the encasement tube and the outside diameter of the screw must be sufficient to allow for downward flow of the liquid phase of the dense gas. In some embodiments, fine particulate solid matter, if present, will flow downward with the liquid phase of the dense gas. The present invention can accomplish extraction of solute from solid matter by employing one inclined auger. In some embodiments, extraction is accomplished using multiple inclined augers, operated in parallel, in series, or both.

The auger is inclined at an angle sufficient to allow the gravitational downward flow of the liquid phase of the dense gas. The angle of inclination of the auger can be increased or decreased, depending on the rate of downward flow desired. In some embodiments, the auger is inclined at an angle in the range of about 10-90° from horizontal, for example, about 15-90°, about 20-60°, about 10-30°, 15-20°, 30-45° from horizontal, for example, about 15°, 16°, 17°, 18°, 19°, 20°, 25°, 30°, 35°, 40°, 45°, 50°, 55°, 60°, 65°, 70°, 75°, 80°, 85° or 90°, or more or less, as desired. In some embodiments, the pressurized auger is positioned vertically. The desired angle of inclination will be in part determined by the friction between the insoluble stream of interest and the auger surface.

Typically, the ratio of the auger pitch (i.e., the spacing between the auger flights) and the auger diameter can range from about 0.9 to about 1.1, for example, about 1.5:1.3; 1.5:1.4; 1.5:1.5; or 1.5:1.6; but can be more or less, as needed.

Slurry from the mixer comprised of solid particulate, solvent, and solute is introduced at a low elevation in the auger. In some embodiments, the slurry of solid and solvent is introduced into the auger about ⅓ from the bottom of the auger (see, FIG. 1).

c. Maintaining Pressure and Temperature in the Housing Containing the Auger to Create a Biphasic Dense Gas The pressure is maintained in the auger such that the gas is at or near a saturated condition, thus enabling the coexistence of a liquid phase and a vapor phase. The pressure conditions prior to introduction of the slurry of solids, solute, and solvent in the auger are adjusted such that the solvent gas is in liquid phase at or near saturation conditions. In all embodiments, the temperature and pressure of the solvent gas is maintained below the critical temperature and critical pressure for the solvent gas, respectively. When operating at ambient temperatures, only the pressure parameter is actively maintained. At saturation conditions, the pressure and temperature of the solvent gas are related by the vapor pressure curve for the solvent gas. To provide an example, vapor pressure data for butane is given in Table 2. The vapor pressure data for dimethyl ether is given in Table 3. Thus, if the pressure is known, the temperature of the solvent gas at a particular pressure is determined by the vapor pressure characteristics of the gas. Given that solvent gas liquid and vapor coexist within the auger, alteration of the auger pressure causes a coupled change in the solvent gas temperature since pressure and temperature cannot be both varied independently when the solvent gas is at a saturation condition. Preferably, the temperature in the auger housing or chamber is about ambient temperature, for example, between about 20-30° C. Most commonly, the pressure is regulated in the auger. When butane is the solvent gas, the pressure in the auger housing or chamber is superambient, about 3 bar, 2.5 bar, 2.0 bar, 1.5 bar, 1.0 bar, or less. When dimethyl ether is the solvent gas, the pressure in the auger housing chamber is can be between 4 bar and 10 bar, for example, about 7 bar.

TABLE 2

Butane Vapor Pressure
n-Butane
Vapor Pressure

| Temperature C. | Pressure bar |
|---|---|
| −10 | 0.70 |
| −5 | 0.85 |
| −4 | 0.88 |
| −2 | 0.96 |
| −1 | 0.99 |
| 0 | 1.03 |
| 2 | 1.11 |
| 5 | 1.24 |
| 10 | 1.48 |
| 15 | 1.76 |
| 20 | 2.08 |
| 22 | 2.21 |
| 24 | 2.36 |
| 26 | 2.51 |
| 28 | 2.67 |
| 30 | 2.83 |
| 32 | 3.01 |
| 35 | 3.28 |
| 40 | 3.78 |

TABLE 3

Dimethyl Ether Vapor Pressure
Dimethyl Ether
Vapor Pressure

| Temperature C. | Pressure bar |
|---|---|
| −10 | 1.85 |
| −6 | 2.15 |
| −2 | 2.48 |
| 0 | 2.66 |
| 2 | 2.85 |
| 4 | 3.05 |
| 10 | 3.72 |
| 14 | 4.22 |
| 16 | 4.49 |
| 20 | 5.07 |
| 24 | 5.70 |
| 26 | 6.04 |
| 28 | 6.39 |
| 30 | 6.75 |
| 32 | 7.13 |
| 36 | 7.94 |
| 38 | 8.37 |
| 40 | 8.82 |

A liquid level of solvent is maintained at a sufficient level in the auger so that at the lower elevations of the auger, the solid is immersed in liquid solvent. Preferably, the liquid level is maintained in the auger below the input point of the wash solvent, when a wash solvent is employed. Typically, the liquid level is maintained in the auger at or near the input point of the slurry of solid and solvent gas. In some embodiments, the liquid level is maintained at about ⅓ from the bottom of the auger. In some embodiments, the liquid level of solvent is maintained in the auger about ½ from the bottom of the auger, or lower.

d. Rotating the Auger to Promote the Separation of the Insoluble Composition from the Solute The inclination, pitch and rotation of the auger screw pushes the solids up the auger and thus lifts the solids from the liquid phases into the gaseous phase. For solids that possess the ability to percolate (meaning that the liquid can freely drain from the solid), this process provides the means to separate the liquefied gas solvent from the solid particulate matter. The clearance between the screw and the auger's outer tubular shell enables solvent solution to flow down the auger.

The lifting of the solids by the screw removes the solvent from the particulate material except for the solvent wetting the particle surfaces. The liquid drains from the solid, resulting in a dramatic reduction in the liquid solvent traveling with the solid compared with the solid/solvent slurry that is fed into the inclined auger. Upon reaching a region near the upper elevation of the auger, the solid is allowed to drop out of the auger.

The auger rotates at a rate sufficient to lift the solid material to the top of the auger while allowing the liquid phase solvent to flow to the bottom of the auger. The solid material lifted into the gaseous phase of the solvent is provided sufficient time to drain liquid phase solvent before expulsion from the top of the auger. The auger rotation speed is sufficiently low such that liquid solvent drains from solid at a rate faster than the solid is being raised, so as to avoid filling the auger entirely with fluid. The speed of auger rotation is balanced with several factors in order to maintain a level of liquid solvent in the auger sufficient to immerse the solid in the input slurry in solvent. These factors include the feed rate of the slurry, the pitch and inclination of the auger, the clearance between the auger and the encasement tube, and the feed rate of the wash solvent, when employed. In some embodiments, the rotation rate can be in the range of 10 to 90 RPM but can be more or less as needed, for example about 5, 10, 20, 30, 40, 50, 60, 70, 80, 90, 100 RPM.

e. Washing the Insoluble Composition with Solvent Gas

In some embodiments, a solvent wash is introduced in the auger. Since the intent of this solvent is to reduce the residual content of solute on the discharged solid, the wash solvent is essentially devoid of solute (i.e., "neat") when delivered to the auger. A pool of liquid phase solvent results in the volume between lower screw flights. The motion of the screw causes solid to be agitated within the solvent wash, thus providing some mixing action.

When employed, the wash solvent is delivered at a feed rate sufficient to wash the solids lifted above the liquid level of the extracting liquid phase solvent while allowing for the maintenance of the liquid level of extracting liquid phase solvent. The feed rate of the wash solvent is balanced with other factors, discussed above, including feed rate of the slurry, the pitch, inclination and rotation speed of the auger, the clearance between the auger and the encasement tube, and the discharge rate of liquid solvent from the bottom of the auger. In embodiments where the pressure is regulated in the auger, the temperature of the solvent gas would be determined by the regulated pressure based on the vapor pressure curve for the respective solvent gas. The temperature of the solvent gas can have some minor secondary influence on mass transfer of the solvent into and around the solid particulate laden with solute.

f. Removing Solvent from the Solid

The residual solvent must be removed from the solid and the material must be lowered in pressure. It is also preferred that the gaseous solvent content in the discharged solid be sufficiently low that the residual gas (e.g., butane, propane, hydrocarbons, and/or dimethyl ether) is well below the lower flammability limit for the material as defined by the National Fire Protection Agency (NFPA). Removal of residual solvent from the discharged solids can be done using any method known in the art. The preferred solid discharge method depends on the degree to which the solid can be compacted to form a limited permeability cake that resists the pressure differential between atmospheric conditions and the pressure within the inclined auger. If particulate solid is friable or fragile, as would be the case with drill cuttings, tar sands, oil shale, and soybean protein, then removal of residual solvent from the discharged the solids can be done in a step-wise batch release through a series of pressure vessels. In the case of vegetable matter or algae, it is possible to form a cake. Therefore, in some embodiments, residual solvent is removed through an extrusion press or a screw mechanism with a progressive pitch screw that results in a compressed cake formation between the mixing region and the atmospheric pressure discharge region.

By using the existence of two phases, a majority of the discharged solids can be lifted from the slurry, enabling the liquid phase of the solvent gas to drain away from the solids. Solids of sufficient density and particle size can be processed with the auger, thus enabling the solid (or a portion thereof) to be processed while avoiding other separation techniques (e.g., belt press, hydrocyclone, or decanting centrifuge (vertical or horizontal)). For some applications that involve a broad particle distribution, for example, large particles in the range of >100 micron in diameter and small particles in the range of <20 micron in diameter, the auger will preferentially process the larger particle size range. The small particles will tend to move with the solvent and solute solution through the lower auger discharge. In this situation, secondary techniques can be employed to separate these fine solids from the liquid solvent/solute phase.

g. Collecting the Solute and Solvent

Solvent and solute nominally travel down the length of the auger. This material can be discharged through a fitting at or near the lowest elevation of the auger. Subsequent to this collection point, the solvent and solute can be delivered to a separation process. While not the subject of this invention, the separation process could apply a change in temperature and/or pressure such that the solvent undergoes a phase change from a liquid to a gas. In the gaseous state, the gas would have essentially no solubility for the solute. Also, a cyclonic separation device finds use to collect the solute from the gas stream.

Those of skill will appreciate that the solute and liquid phase gas can optionally flow out the end of the auger or at an outlet near the end of the auger. In some embodiments, the solute and liquid phase gas flow toward the bottom and then flow out a vertical column. Because of the pressure differential between the inlet and the outlet of the pressurized auger tube chamber, the solute and liquid phase gas discharge can in certain instances be lower than the elevation at which the gas is introduced into the auger. Surprisingly, in other instances the solute and liquid phase gas discharge can be higher than the elevation at which the gas is introduced into the auger.

3. Extraction-Separation System

Figure 1:
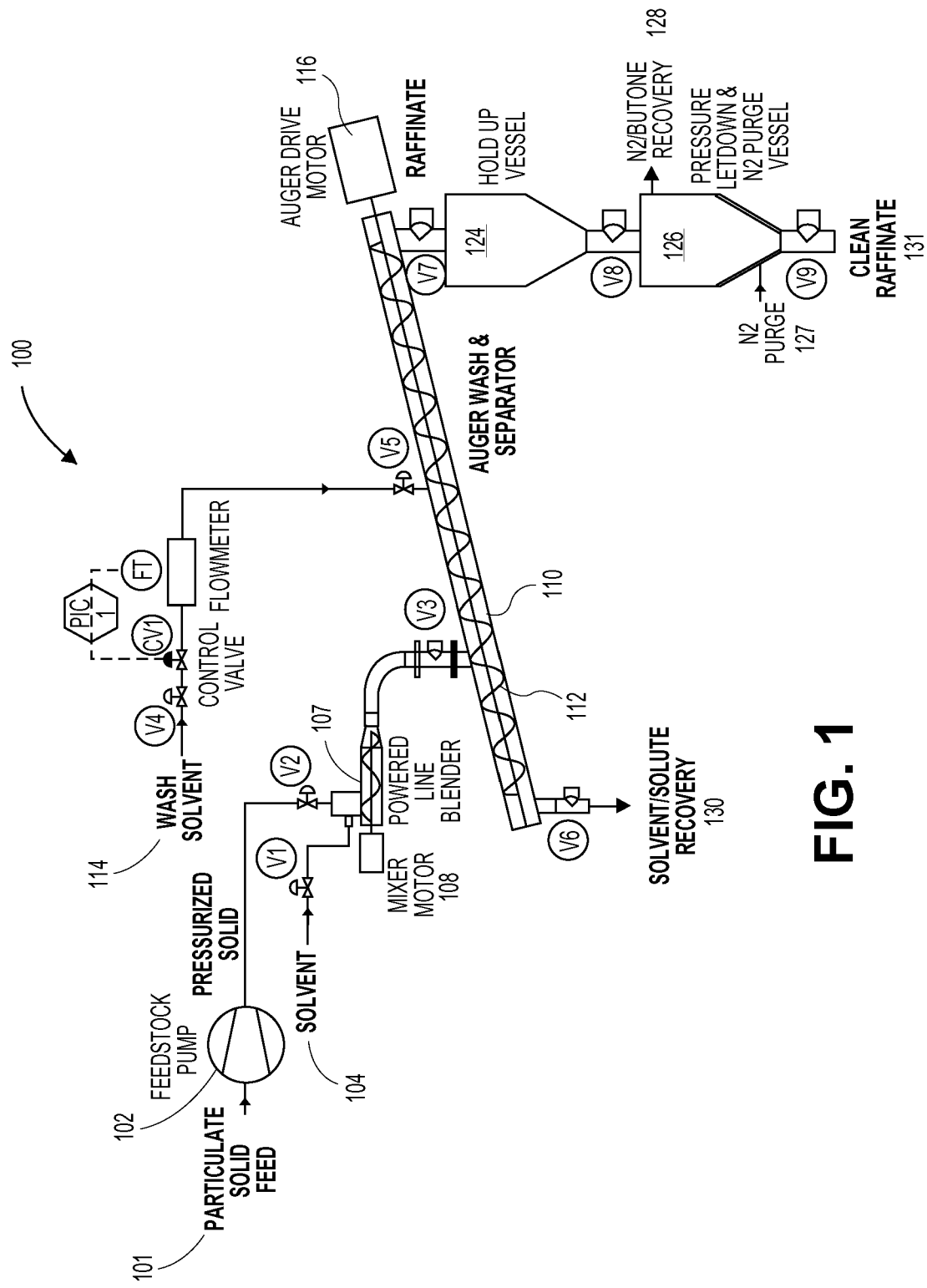
FIG. 1 illustrates a system diagram for a continuous dense gas extraction process.

FIG. 1 shows one embodiment of a system 100 for solid particulate (solid slurry) that can be pumped. The solid slurry feed 101 is at atmospheric pressure. The feedstock pump 102, for example, a multi-stage, progressive cavity pump from Moyno, Seepex, or Netzsch, is used to increase the pressure of the solid feed from atmospheric condition to a pressure sufficient to maintain the solvent in the liquid phase. The discharge pressure for the solid feed is set to a level appropriate for the solvent to be in the liquid phase. This solid feed material flows through valve V2 to the powered line blender 107. In the event that particulate solid is supplied to the process at a pressure in excess of the vapor pressure for the solvent at the current temperature condition, then the feedstock pump would not be required, and V2 could provide a controlled pressure reduction. Solvent 104 that can be nominally partially saturated with solute is introduced into the process through valve V1. The solvent and solid streams can be combined prior to introduction into the powered line blender 107. The line blender 107 is driven by a mixing motor 108. This blender 107 brings the solvent 104 into contact with the particulate solid 101 and yields slurry.

In an alternate embodiment, the powered line blender 107 can be replaced by a static mixer. This is suitable, for example, in a situation in which the solid slurry has (i) sufficiently low viscosity, (ii) an absence of fibrous (oblong length) particulate, and (iii) a sufficiently high feed rate. Examples of commercially available static mixers include the Sluzer Chemtech SMF, the Komax A series motionless mixer, and the Ross LPD static mixer.

Extraction can, but need not take place within the auger tube. The pressurized auger finds use in separation as well as concurrent separation and extraction modes. The systems of the invention can also include an extraction chamber that is in fluid communication with the pressurized auger tube. The mixture of solids and solvent are first delivered to the extraction chamber before being delivered to the auger tube. Extraction chambers can employ any method for agitation known in the art to effect extraction of the solute into the solvent, including shaking, stirring, and pressurized solvent flow. For example, vegetable matter or animal matter can be effectively extracted in a stirred chamber before introduction into the auger. As demonstrated in FIGS. 4-12, oilseed matter can be effectively extracted in a countercurrent column, wherein a moving packed bed of oilseed flake descends through a rising column of liquefied gas.

The slurry is delivered to the inclined auger 110 at a lower elevation through valve V3. Valve V3 can either be a pinch valve, for example, those commercially available from Red Valve, Onxy Valve, or Larox, or can be rotary plug valve, for example, those commercially available from Roto-Disc. The preferred selection of valve is dependent on the particular solid feedstock, as is known to those skilled in the relevant arts.

The screw 112 within the auger 110 conveys the solid material up the auger. The inclination angle of the auger is matched with the density and particle size for the solids. Typically, this is in the range from about 10-45° from horizontal, for example, about 10-90° from horizontal, for example, about 15-90°, about 20-60°, about 10-30°, 15-20°, 30-45° from horizontal, for example, about 150, 16°, 17°, 18°, 19°, 20°, 25°, 30°, 35°, 40°, 45°, 50°, 55°, 60°, 65°, 70°, 75°, 80°, 85° or 90°, or more or less, as desired. In some embodiments, the pressurized auger is positioned vertically. The clearance between the outer diameter of the screw 112 and the tubular shell enables solvent, solute, and smaller diameter particles, if present, to travel down the auger. This solvent/solute solution discharges from the auger via valve V6. The solution subsequently goes to a separation process to collect the solute and a recovery means to recycle the solvent. Preferably, the screw conveyors used in the present systems are not tapered.

The solid that is conveyed up the auger 110 can be subjected to a countercurrent flow of neat wash solvent 114 (solvent with vanishing lower concentration of solute). This neat wash solvent 114 is shown as wash solvent delivered into the process via valve V4. Nominally, the pressure of the solvent at V4 can be in excess of the pressure necessary to maintain the solvent in the liquid phase. This material is discharged into the process at a controlled rate using control valve CV1 to meter the solvent into the auger. The flow of solvent is measured via flow meter FT, which could be any flow meter technology from a turbine flow meter, thermal mass flow meter, or coriolis mass flow meter. Flow controller FIC1 provides a means to enter a flow setpoint, accepts measurement of actual flow via sensor FT, and effects a control action to maintain flow at the target level via CV1. Valve V5 is the entry point for solvent wash into the inclined auger 110. This valve can serve two or more functions. The valve can server as a positive shutoff valve to isolate the auger from the wash solvent supply or as a pressure reduction device so that the pressure within the auger is maintained at a level so that saturated solvent liquid and vapor coexist within the auger.

Solid material is conveyed to a higher elevation above the V5 location. This continued vertical conveyance permits the excess solvent and solute solution to drain through the clearance between the auger shell and the screw to further dry the solid material. The screw speed, as determined by the auger drive motor 116 speed, should be set at a level sufficiently low such that liquid solvent drains from solid at a rate faster than the solid is being raised, so as to avoid filling the auger entirely with fluid. When this condition is properly satisfied, the solvent remaining on the solid that is conveyed to the discharge location (raffinate) at V7 is limited to liquid wetting out the particulate surfaces. This material is discharged into the hold up vessel. The auger drive motor can be any appropriate drive motor known in the art, including traditional fuel-consuming drive motors and magnetic drive motors. For example, the drive motor could be an AC motor and variable frequency drive from Allen Bradley, Reliance Electric, ABB, Siemens, Sumitomo, or SEW Eurodrive. Speed reducers are commercially available from, for example, Stober, Dodge, Boston Gear, Eurodrive, or Sumitomo.

As can be appreciated from the above disclosure, one aspect of the present invention is directed toward the proper functioning of the extractor separator. The proper functioning includes using a controller to monitor and control various parameters, including regulating the speed of the auger rotation; the feed rate of the "wash" solvent gas (which is in the liquid state when introduced into the auger), when used; the feed rate of the slurry; the pitch of the auger; the clearance between the auger and the surrounding pipe, and the angle of inclination of the auger; as well as other process parameters. These factors are controlled to achieve the result of carrying the drained solids uphill to the discharge point, not overfilling the auger with the liquid phase, and getting the solvent wash (and fines) to flow downhill or downward via the clearance between the auger and the surrounding pipe.

A controller for managing these factors can also be configured to control one or more of the following parameters: the pressure of the inclined pressurized tube, the speed of the rotation of the screw, the feed rate of the solid feed, the feed rate of the slurry, the feed rate of the wash solvent, and combinations thereof. The temperature can vary with fluctuation in the system pressure. The pitch of the auger is fixed at the time of system assembly and is not actively varied during the operation of the process. The system when functioning properly is configured to deliver the drained solids uphill maintain a liquid solvent level within the tube, preferably below the wash solvent inlet (V5) and cause the solvent and the solute to flow down the auger separator due to gravity-induced flow. The screw speed in the system can be determined by the auger drive motor 116 speed, can be set at a level sufficiently low such that liquid solvent drains from solid at a rate faster than the solid is being raised, so as to avoid filling the auger entirely with fluid.

As an alternate embodiment of the inclined auger mechanism, the solvent can be removed from the auger using a permeable medium, for example, a screen or sintered metal. This material can be placed over the lower section of the auger and provides an expanded area from which solvent and solute could drain. This embodiment provides an increased area for spreading the solid particulate to enable draining thus allowing the reduction in the clearance between the auger outer diameter and the tubular auger shell. This enables smaller diameter particles to be pushed up the auger. The permeable medium can be a part of the tube. In such a case, a portion of the pressurized inclined tube between V3 and V6 can be replaced with a permeable media, for example, a perforated metal or screen. The portion of the pressurized inclined tube replaced with a permeable media, e.g., below V3, is defined to be the permeable drain zone. This permeable media of the permeable drain zone is placed within a secondary and non-permeable pressure containment housing.

The solute and liquid phase gas can optionally flow out the end of the auger or at an outlet near the end of the auger. In some embodiments, the solute and liquid phase gas flow toward the bottom and then flow out a vertical column.

After the solid is extracted from the auger separator, the solid is released in an incremental batch-wise manner from the system. Material is permitted to accumulate in the hold up vessel 124 for a defined time period that is related to the flow of solid into the process and the rotational speed of the auger. To discharge material, valve V7 is closed and valve V8 (that was previously closed) is opened. Solid particulate falls via gravity feed into the Pressure Letdown and inerting gas (e.g., N2) Purge vessel 126. After emptying the hold up vessel 124, valve V9 is closed. Valve V8 is closed and valve V7 is opened to once again enable solid particulates to communicate with the hold up vessel 124. By opening a valve on the inerting gas (e.g. nitrogen (N2))/solvent gas recovery line 128, the pressure in the vessel is lowered to atmospheric pressure. In the process, the liquid solvent that was wetting out the solid particles is converted from a liquid to a gas. During this change of phase, the gas temperature is lowered due to change in enthalpy of the material converting from a liquid to a gas phase. It is characteristic of this invention that the mass and specific heat of the solid is sufficiently great relative to the mass and change in enthalpy of the gas while changing phase, that the decrease in temperature of the combined system (gas and solid) remains above the freezing point of water. For example, the boiling point of butane is −0.5° C.

Once the pressure is relieved, an inerting agent (e.g., nitrogen gas or another inert gas) at near atmospheric conditions can be introduced into the vessel via the inerting gas (e.g., N2) purge 127. This acts to displace the solvent gas and to dilute the flammable gas with an inert gas. While nitrogen is a suitable inerting agent, any inert gas can be used into this operation and could include carbon dioxide or argon. An excess of inert gas is introduced into the vessel such that the nominal concentration is less than 25% of the lower flammability limit as defined by the NFPA for the flammable gas.

After the solid material has been sufficiently inerted, the clean raffinate 131 is discharged from the Pressure Letdown vessel 126. The clean raffinate 131 possesses a much smaller portion of the solute that the solid feed material 101. Typically, residual solute is less than 4 weight percent of the feed material 101, more typically, this value is less than 2 wt % and, under optimum operating conditions, much less than 1 wt %. The pressure within the vessel is reduced again to atmospheric conditions. All gas inlet 127 and outlet lines 128 are closed. Valve V9 is opened to enable the raffinate 131 to be released via gravity flow. After the solid is released, valve V9 is closed to ready the system for another discharge cycle.

EXAMPLES

The following examples are offered to illustrate, but not to limit the claimed invention.

In the following examples, an inclined auger comprised of an outer shell of 1½ inch clear PVC pipe was used with a nominal 1.5 inch diameter auger. The Schedule 80 PVC pipe was 1½ inch nominal pipe size from Harvel Plastics with an outer diameter of 1.900 inch and average inner diameter of 1.476 inch. The auger was 303 stainless steel with outer diameter of 1.42 inches, a pitch of 1.5 inches, a flight thickness of 0.19 inch, and 0.50 diameter shaft thickness. The auger possessed a solid center shaft. The upper end of the auger passed through an upper bearing and a multiple stage O-ring seal capable of retaining a pressure of over 7.9 bar absolute (100 psig). The shaft timing belt pulley was mounted on the shaft and the shaft was driven by a ½ horsepower inverter duty motor and an Allen Bradley Powerflex 40 variable frequency drive. The lower end of the shaft was not mounted in a bearing or bushing. The nominal weight of the auger was carried by the outer shell. The auger and shell was mounted in an aluminum framework such that angle of inclination of the auger was maintained at 20 degrees from horizontal.

Solid slurry material was transferred into the auger using a Blackmer AS20 Hose pump with a 1 HP gearmotor, 48.08 gear ratio, inverter rated, and a 6.2 to 37 RPM rated speed range. The Blackmer AS20 Hose pump was powered by an Allen Bradley Powerflex 40 to enable the pump speed to be varied. A stuffing volume was used at the suction inlet for the pump to enable solids to be loaded into the pump. The viscosity and flow characteristics of the solid feed were adjusted by dilution of the slurry feed material with a liquid compatible with solid substrate, the solute, the materials of construction of the system, and the solvent gas. Further, a manual stuffing mechanism was used to force slurry material into the hose pump.

Wash solvent gas was introduced into the system by a employing a storage container (cylinder) of the solvent gas with a nitrogen pressure head. The nitrogen served to provide the motive force to introduce the gas into the system and also maintained all the solvent gas in the cylinder in the liquid phase. Nitrogen was not soluble in the solvent gas. A needle value regulated the flow of solvent gas into the in-line blender and the wash solvent for the inclined auger. As an alternate embodiment, the apparatus used a Blackmer Sliding Vane Pump SLG1.5 with a gearbox and inverter rated motor driven by an Allen Bradley Powerflex 40 variable frequency drive.

The in-line blender was constructed from a 1½ inch diameter schedule 80 clear PVC from Harvel Plastics. A Jiffy Mixer model LM with a welded 304 stainless steel double blade configuration, a ¼ inch diameter shaft, and a 1¼ inch outer mixer diameter provided mixing. This mixer was an all purpose, heavy duty industrial mixer for agitating dense and viscous substrates. This mixer was placed within the 1½ inch tube with a oil seal to maintain a system pressure of over 7.9 bar absolute (100 psig). An air driven mixing gearmotor from McMasterCarr powered the in line blender. The mixer was positioned mid length in a 1½ inch PVC pipe section. A tee in the reducing tee in the 1½ pipe permitted introduction of the slurry solid into the mixer. A ¼-inch NPT tap in the pipe provided an entry point for the solvent gas. The solid and solvent gas stream was pushed through the active agitator. The mixed, solvent gas-diluted stream discharged from the end of the mixer and into the feed port of the auger (V3 in FIG. 1).

For purposes of the following examples, the solvent gas was vented to atmosphere. A vestibule vessel was placed on the solvent/solute discharge (downstream of V6 in FIG. 2). This served to capture the gas and solute during the period of the test. By isolating this chamber from auger by closing V6, this chamber was depressurized to enable recovery of the solute from the solvent gas. This scheme was identical to the depressurization scheme for the raffinate shown in FIG. 1, utilizing the hold up vessel 124 and the pressure letdown and N2 purge vessel 126. For the extract recovery, only a single vestibule chamber was employed. A needle valve was used to discharge the solute from this vestibule chamber to atmospheric conditions.

For the raffinate collection, the example apparatus combined the functions of the hold up vessel 124 and the pressure letdown and N2 purge vessel 126. A single vessel performed both functions. A 1½" diameter 304L stainless steel sanitary butterfly valve from McMaster Carr (P/N: 4933K181) isolated the vestibule chamber from the Auger (V7 in FIG. 1) and isolated the vessel from atmosphere (V9 in FIG. 1).

Example 1

Drill Cutting Cleaning

Drill cuttings with a median particle size of 250 microns are processed. Minimum particle size is submicron. Maximum particle size is 6 mm. This material is 21 wt % oil, 10 wt % water, and the balance sandstone and barite solids. The solvent gas is liquid butane with a nominal system pressure of 2.4 bar. The experiment is run at room temperature conditions nominally on the range from 23° C. to 34° C.

Solid slurry is diluted with 10 W-40 lubricating oil with a ratio of 0.25:1 wt oil:wt drill cuttings to decrease the viscosity of the drill cuttings and facilitate pumping. Material is pumped at a mean rate of 250 g/min. Butane liquid is introduced into the mixer at a rate of 200 g/min.

This solvent gas diluted slurry mixture is introduced into the inclined auger. The auger rotation is 25 RPM. Wash butane is introduced into the auger at a rate of 50 g/min.

The solvent gas and solute mixture and fines with diameter less than 50 micron are washed down the auger and into the extract discharge. Upon depressurization of the extract discharge, there is a mixture of oil and fine material. The fine material in this mixture represents approximately 15 wt % of the solid content in the drill cutting feed. The raffinate discharge moves up elevation by the inclined auger and discharged into the raffinate vestibule vessel. No heat is required to flash the butane liquid that remains on the surface of the raffinate discharge due to the heat capacity within the solid exceeding the energy required to flash the liquid butane to vapor. The raffinate solid represents 85 wt % of the solid content in the feed material.

Example 2

Swarf

Metal debris from a metalworking operation (swarf) is obtained from a local machine shop. This material has been drained through a sieve. Oil content in the material is known via combustion of oil and gravimetric measurement to be 29 wt % of the feed material. Solids are known to be as large as 6 mm wide and 500 micron thick and as small as 1 mm wide and 200 micron thick. The solvent gas is liquid butane with a nominal system pressure of 2.4 bar. The experiment is run at room temperature conditions nominally on the range from 23° C. to 34° C.

Solid slurry is diluted with 10 W-40 motor oil with a ratio of 0.25:1 wt oil:wt swarf to facilitate stuffing of the feed material into the hose pump. Material is pumped at a mean rate of 400 g/min. Butane liquid is introduced into the mixer at a rate of 300 g/min.

This solvent gas diluted mixture is introduced into the inclined auger. The auger rotation is 35 RPM. Wash butane is introduced into the auger at a rate of 100 g/min.

The solvent gas is washed down the auger and into the extract discharge. Little solid matter travels with the oil since the swarf material had few fines. Upon depressurization of the extract discharge, there is a mixture of cutting oil and 10W-40 motor oil. The raffinate discharge moves up elevation by the inclined auger and discharges into the raffinate vestibule vessel. No heat is required to flash the butane liquid that remains on the surface of the raffinate discharge due to the heat capacity within the solid exceeding the energy required to flash the liquid butane to vapor.

Example 3

Canola

Flaked canola (rapeseed) with a nominal diameter of 2 mm and a thickness of approximately 200 micron is used as feed material. Material is sifted through a US Sieve Size No. 100 (149 micron opening). The overflow from this sifting operation is used in the test. Based on an AOCS test method, this material has an oil content of 45 wt %. The balance of the material is fiber, sugars, and water. The solvent gas is liquid butane with a nominal system pressure of 2.4 bar. The experiment is run at room temperature conditions nominally on the range from 23° C. to 34° C.

Solid slurry is diluted with canola oil with a ratio of 0.1:1 wt oil:wt canola flake to facilitate stuffing of the feed material into the hose pump. Material is pumped at a mean rate of 100 g/min. Butane liquid is introduced into the mixer at a rate of 75 g/min.

This solvent gas diluted mixture is introduced into the inclined auger. The auger rotation is 30 RPM. Wash butane is introduced into the auger at a rate of 25 g/min.

The solvent gas and solute solution flowed down the auger and into the extract discharge vessel. Little solid matter travels with the oil since the fine material is pre-sifted prior to extraction. Upon depressurization of the extract discharge, there is canola oil. The raffinate discharge moves up elevation by the inclined auger and discharged into the raffinate vestibule vessel. No heat is required to flash the butane liquid that remains on the surface of the raffinate discharge due to the heat capacity within the solid exceeding the energy required to flash the liquid butane to vapor.

As will be understood by those skilled in the art, the present invention may be embodied in other specific forms without departing from the essential characteristics thereof. These other embodiments are intended to be included within the scope of the present invention, which is set forth in the following claims.

What is claimed is:

1. A method of extracting and separating a solute from an insoluble composition using an inclined auger in a pressurized chamber, the method comprising:
   a) passing the insoluble composition comprising solute into a pressurized inclined housing containing an auger having screw flights;
   b) combining the insoluble composition with a solvent gas in either the supercritical or liquid phase to dissolve the solute, thereby extracting the solute from the insoluble composition;

c) maintaining pressure in the housing sufficient to create a biphasic dense gas comprising a vapor phase and a liquid phase, wherein liquid phase solvent gas is maintained at a level in the pressurized inclined housing sufficient for the insoluble composition to be immersed in liquid phase solvent gas at lower elevations of the housing including a pool of liquid phase solvent in the volume between lower screw flights of the auger; and d) rotating the auger to promote the separation of the insoluble composition from the solute;

whereby the solute and the liquid phase of the dense gas flow to the bottom of the auger for removal and the insoluble composition and vapor phase of the dense gas move to the top of the auger for removal, thereby separating the solute from the insoluble composition.

2. The method of claim 1, further comprising step e) washing the insoluble composition with solvent liquid phase gas.

3. The method of claim 1, wherein the solvent is selected from the group consisting of an inert gas, an alkane gas, an alkene gas, an alkyne gas, and a noble gas.

4. The method of claim 1, wherein the solvent gas contains nitrogen.

5. The method of claim 4, wherein the solvent gas is selected from the group consisting of ammonia, nitric oxide, nitrogen dioxide, and nitrous oxide.

6. The method of claim 1, wherein the solvent gas contains silicon.

7. The method of claim 1, wherein the solvent gas is selected from the group consisting of silane, chlorotrifluorosilane, and tetrafluorosilane.

8. The method of claim 1, wherein the solvent gas contains sulfur.

9. The method of claim 8, wherein the solvent gas is selected from the group consisting of sulfur dioxide and sulfur hexafluoride.

10. The method of claim 1, wherein the solvent gas contains halogen.

11. The method of claim 10, wherein the solvent gas is selected from the group consisting of monofluoro methane, trifluoro methane, tetrafluoro methane, monochlorodifluoro methane, monochlorotrifluoro methane, dichlorodifluoro methane, dichloromonofluoro methane, trichlorofluoro methane, monobromotrifluoro methane, monofluoro ethane, hexafluoro ethane, chloropentafluoro ethane, perfluoro butane and 1,1 difluoro ethylene.

12. The method of claim 1, wherein the solvent gas is selected from the group consisting of butane, isobutane, isobutene, propane, carbon dioxide, dimethyl ether, methane, ethane, nitrous oxide, propylene, ethylene, sulfur hexafluoride, ammonia, gaseous hydrocarbons, gaseous halogenated hydrocarbons, fluorocarbons, and mixtures thereof.

13. The method of claim 1, wherein the method is continuous.

14. The method of claim 1, wherein the mixture is passed through one auger.

15. The method of claim 1, wherein the mixture is passed through multiple augers.

16. The method of claim 1, wherein the mixture is non-aqueous.

17. The method of claim 1, wherein the mixture is aqueous.

18. The method of claim 1, wherein the solvent gas is introduced into the auger at saturation conditions such that control of the pressure results in a temperature near ambient conditions.

19. The method of claim 1, wherein the solvent gas is at saturation conditions in the housing containing the auger.

20. The method of claim 1, wherein the temperature of the auger is maintained at or near ambient temperature.

21. The method of claim 1, wherein the temperature of the auger is maintained at a superambient temperature.

22. The method of claim 1, wherein the temperature of the auger is maintained at a subambient temperature.

23. The method of claim 1, wherein the insoluble composition is plant matter.

24. The method of claim 23, wherein the insoluble composition is flaked seed from an oilseed plant.

25. The method of claim 23, wherein the plant matter is selected from the group consisting of soybean, rapeseed, canola, camolina, corn, sunflower, palm, jatropha, corn germ, distillers grains, safflower, cottonseed, flax, peanut, sesame, olive and coconut.

26. The method of claim 23, wherein the insoluble composition is from a plant nut.

27. The method of claim 26, wherein the plant nut is from a plant selected from the group consisting of almond, cashew, hazelnut, macadamia, pecan, pistachio and walnut.

28. The method of claim 23, wherein the insoluble composition is a wood material.

29. The method of claim 28, wherein the wood material is from a tree selected from the group consisting of cedar and pine.

30. The method of claim 1, wherein the insoluble composition is animal matter.

31. The method of claim 30, wherein the animal matter is selected from the group consisting of beef rendering, chicken rendering, pork rendering, and fish rendering.

32. The method of claim 1, wherein the insoluble composition is geological matter.

33. The method of claim 32, wherein the insoluble composition is geological matter and the solute is organic chemical constituents.

34. The method of claim 1, wherein the insoluble composition is swarf or metal cuttings.

35. The method of claim 1, wherein the insoluble composition is industrial or man-made waste.

36. The method of claim 1, wherein the insoluble composition is polymer waste.

37. A system of extracting and separating a solute from an insoluble composition using an inclined auger in a pressurized chamber, the system comprising:

a solid feed inlet configured to receive a mixture of a solid particles and a solute;

a solvent inlet configured to receive a solvent;

a pressurized inclined tube having an inner diameter in fluid communication with said solid feed inlet;

said pressurized inclined tube having a first outlet near the first end and a second outlet near the second end of said pressurized inclined tube, and a first inlet located between said first and second outlets, said first inlet being configured for fluid communication with said solid feed inlet;

a screw dimensioned to fit within the pressurized inclined tube, such that the screw and the pressurized inclined tube together form an auger separator having screw flights;

said screw having an outer diameter that is smaller than the inner diameter of the pressurized inclined tube by a clearance gap; and control means for operating said auger separator configured for: (a) maintaining pressure or temperature conditions sufficient to create a biphasic dense gas comprising a vapor phase and a liquid phase in the auger separator; (b) delivering said solid particles and the solvent in gaseous form towards the second outlet of said pressurized inclined tube; and (b) delivering said solvent and said solute in a liquid form towards the first outlet through the clearance gap, wherein liquid phase solvent gas is maintained at a level in said pressurized inclined tube sufficient for the insoluble composition to be immersed in liquid phase solvent gas at lower elevations of the pressurized inclined tube including a pool of liquid phase solvent in the volume between lower screw flights of the auger.

38. The system of claim 37, further comprising a mixer configured to mix the solid particles and the solute into the solvent to form a slurry, wherein said mixer is in fluid communication with said solid feed outlet and said first inlet of said pressurized inclined tube.

39. The system of claim 37, wherein the angle of inclination of said inclined tube is from about 15 to about 90 degrees.

40. The system of claim 37, wherein said control means is configured to control at least one parameter selected from the group consisting of: the pressure of the inclined pressurized tube, the temperature of the pressurized inclined tube, the speed of the rotation of the screw, the pitch of the screw, the feed rate of the solid feed; the feed rate of the slurry, the feed rate of the solvent, and combinations thereof.

41. The system of claim 40, wherein said control means is configured to (a) deliver the drained solids uphill to the second outlet, (b) maintain a liquid solvent level upstream of the second outlet and (c) cause the solvent and the solute to flow down the auger separator due to gravity-induced flow toward the first outlet.

42. The system of claim 40, wherein the screw speed, as determined by the auger drive motor speed, is set at a level sufficiently low such that liquid solvent drains from solid at a rate faster than the solid is being raised, so as to avoid filling the auger entirely with fluid.

43. The system of claim 37, further comprising a second inlet for delivering a solvent, configured to be in fluid communication with the pressurized inclined tube.

44. The system of claim 43, wherein said second inlet is configured to deliver a solvent at a higher elevation from said first inlet.

45. The system of claim 44, wherein said second inlet is configured to deliver said solvent in a liquid state.

46. The system of claim 44, wherein said solvent is partially saturated with the solute.

47. The system of claim 44, wherein said solvent is essentially free of the solute.

48. The system of claim 37, wherein a portion of the pressurized inclined tube is permeable.

49. The system of claim 48, wherein the portion of the pressurized inclined tube that is permeable is the permeable drain zone.

50. A method of extracting and separating a solute from an insoluble composition using an inclined auger in a pressurized chamber, the method comprising:
 a) passing the insoluble composition comprising solute into a pressurized inclined housing containing an auger having screw flights;
 b) combining the insoluble composition with a solvent gas in either the supercritical or liquid phase to dissolve the solute, thereby extracting the solute from the insoluble composition;
 c) maintaining pressure in the housing sufficient to create a biphasic dense gas comprising a vapor phase and a liquid phase, wherein the solvent gas is maintained at a temperature within 5° C. of the vapor pressure curve for the solvent gas to maintain a pool of liquid phase solvent in the volume between lower screw flights of the auger; and
 d) rotating the auger to promote the separation of the insoluble composition from the solute;
 whereby the solute and the liquid phase of the dense gas flow to the bottom of the auger for removal and the insoluble composition and vapor phase of the dense gas move to the top of the auger for removal, thereby separating the solute from the insoluble composition.

* * * * *